US012783150B2

(12) United States Patent
Ock

(10) Patent No.: US 12,783,150 B2
(45) Date of Patent: Nov. 3, 2026

(54) MEMORY CONTROLLER MANAGING ERASURE TIME OF MEMORY BLOCK, STORAGE APPARATUS INCLUDING THE MEMORY CONTROLLER AND METHOD OF OPERATING THE MEMORY CONTROLLER

(71) Applicant: SK hynix Inc., Icheon-si (KR)

(72) Inventor: Eun Jae Ock, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/796,749

(22) Filed: Aug. 7, 2024

(65) Prior Publication Data

US 2025/0315184 A1 Oct. 9, 2025

(30) Foreign Application Priority Data

Apr. 5, 2024 (KR) ........................ 10-2024-0046792

(51) Int. Cl.
*G06F 3/06* (2006.01)

(52) U.S. Cl.
CPC .......... *G06F 3/0652* (2013.01); *G06F 3/0616* (2013.01); *G06F 3/0679* (2013.01)

(58) Field of Classification Search
CPC ..... G06F 3/0652; G06F 3/0616; G06F 3/0679
See application file for complete search history.

(56) References Cited

U.S. PATENT DOCUMENTS 9,431,113 B2 8/2016 Fitzpatrick et al.
2015/0043277 A1* 2/2015 Fitzpatrick .......... G11C 11/5635 365/185.11
2015/0161034 A1* 6/2015 Fisher .................. G06F 3/0679 711/103
2015/0277795 A1* 10/2015 Choi ..................... G06F 3/0616 711/103
2016/0162403 A1* 6/2016 Camp ................... G06F 11/108 711/103
2018/0004653 A1* 1/2018 Moon ................. G06F 12/0253
2023/0073518 A1* 3/2023 Kao ...................... G06F 3/0679

FOREIGN PATENT DOCUMENTS

KR 10-0984829 B1 9/2010
KR 10-2393323 B1 4/2022

* cited by examiner

*Primary Examiner* — Eric T Loonan

(57) ABSTRACT

A memory controller may control a storage medium including a plurality of memory blocks. The memory controller may include at least one processor configured to generate and output an erase indicator, assign the erase indicator to the memory block to be closed, update the erase indicator when the memory block to be closed has been closed, and determine whether to open a selected memory block by comparing the assigned erase indicator of the selected memory block and the updated erase indicator.

20 Claims, 8 Drawing Sheets

MEMORY CONTROLLER MANAGING ERASURE TIME OF MEMORY BLOCK, STORAGE APPARATUS INCLUDING THE MEMORY CONTROLLER AND METHOD OF OPERATING THE MEMORY CONTROLLER

CROSS-REFERENCE TO RELATED APPLICATION

The present application claims priority under 35 U.S.C. § 119(a) to Korean application number 10-2024-0046792, filed on Apr. 5, 2024, in the Korean Intellectual Property Office, which is incorporated herein by reference in its entirety.

BACKGROUND

1. Technical Field

The present technology relates to integrated semiconductor devices, and more particularly to a memory controller, a storage apparatus including the memory controller and a method of operating the memory controller.

2. Related Art

A storage apparatus is electrically coupled to an external device. The storage apparatus performs data input and output operations as requested by the external device. The storage apparatus may use various storage media to store data. For example, the storage apparatus may adopt a non-volatile memory device, such as a flash memory device, as a storage medium.

The flash memory device cannot overwrite or update data that is already in-place. Further, the size of a unit for reading or programming the data and the size of a unit for erasing the data are different in a flash memory device. Thus, before data is programmed in a specific page of the flash memory device, a memory block including the specific page needs to be erased.

The number of Program/Erase (PE) cycles of a flash memory device, indicating how many times data can be programmed and erased, directly impacts the device's lifespan. As the data erase interval for a given memory block shortens, data retention time decreases, consequently reducing the overall lifespan of the flash memory.

SUMMARY

Example embodiments may provide a memory controller for managing erase intervals to prevent the same memory block from being repeatedly erased.

Example embodiments provide a storage apparatus including the above-mentioned memory controller.

Example embodiments also provide a method of operating the above-mentioned storage apparatus having the memory controller.

According to example embodiments, there may be provided a memory controller may control a storage medium including a plurality of memory blocks. The memory controller includes at least one processor. The at least one processor: generates an erase indicator, assigns the erase indicator to a memory block to be closed, updates the erase indicator, and determines whether to open a selected memory block to process a write request by comparing the assigned erase indicator of the selected memory block and the updated erase indicator.

According to example embodiments, there may be provided a storage apparatus may include a storage medium including a plurality of memory blocks, and a memory controller controlling the storage medium and comprising at least one processor. The at least one processor is configured generate an erase indicator, assign the erase indicator to a memory block to be closed, and update the erase indicator when the erase indicator is assigned to the memory block to be closed, and wherein the at least one processor is configured to determine whether to open a selected memory block to process a write request by comparing the assigned erase indicator of the selected memory block and the updated erase indicator.

In a method of operating a memory controller in accordance with example embodiments, the memory controller may include at least one processor that controls a storage medium including a plurality of memory blocks, the method comprising: generating, by the at least one processor, an erase indicator of at least one of a plurality of memory blocks; assigning, by the at least one processor, the erase indicator to at least one of the plurality of memory blocks to be closed and updating the erase indicator when the memory block to be closed is closed; and determining, by the at least one processor, whether to open a closed memory block for processing a write request by comparing the assigned erase indicator of the closed memory block and the updated erase indicator.

According to example embodiments, an erasing timing of the memory block may be easily managed. Further, a specific memory block is prevented from being repeatedly erased within a limited time.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concepts. Although only a few embodiments of the present invention will be shown and described, it will be appreciated by those of ordinary skill in the art that changes may be made in these examples without departing from the principles and spirit of the present invention.

As used herein, the term "configured" refers to a size, shape, material composition, orientation, and arrangement of one or more of at least one structure and at least one apparatus facilitating operation of one or more of the structure and the apparatus in a pre-determined way.

As used herein, the singular forms of "a," "an," and "the" are intended to include the plural forms as well, unless the context clearly indicates otherwise.

As used herein, the phrase "coupled to" and "connected to" refer to structures operatively connected with each other, such as electrically connected or through an indirect connection (e.g., by way of another structure).

As used herein, the term "write", "program", "record", and "store" may be interpreted to have the same meaning.

As used herein, the phrase "memory block to be closed" may be a target memory block that has not been closed. Further, the phrase "closed memory block" may be a memory block that no longer performs memory operations. Furthermore, the phrase "open memory block" may be a memory block capable of performing memory operations.

Embodiments of the present disclosure will now be described in more detail with reference to the accompanying drawings.

Figure 1:
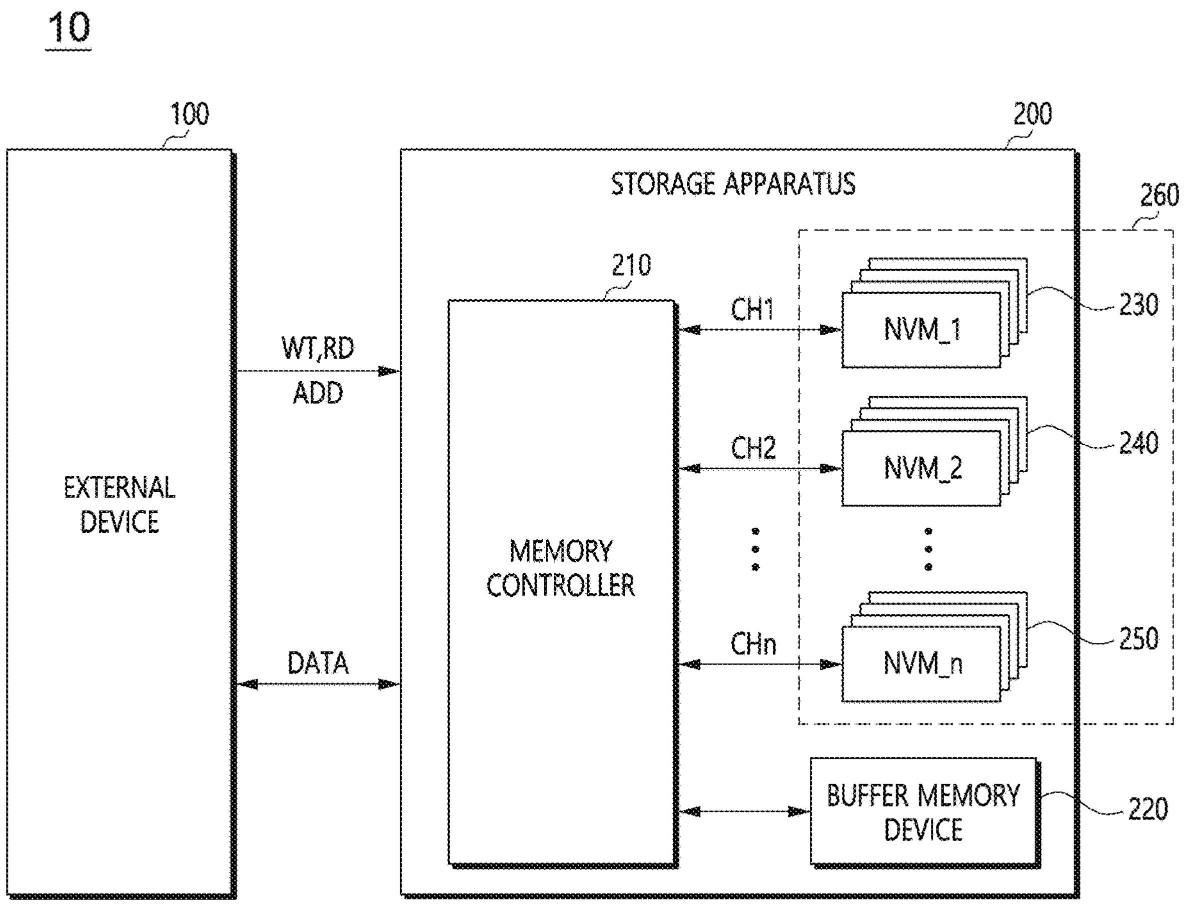
FIG. 1 is a block diagram of a data processing system according to embodiments of the disclosure.

FIG. 1 is a block diagram of a data processing system according to embodiments of the disclosure.

Referring to FIG. 1, a data processing system 10 may include an external device 100 and a storage apparatus 200.

The external device 100 may include at least one processor, or may be a processor itself. For example, the external device 100 may be an electronic device or an electronic system that includes the processor.

The storage apparatus 200 may include a memory controller 210, a buffer memory device 220 and a storage medium 260. The storage medium 260 may include a plurality of non-volatile memory devices 230, 240 and 250.

The external device 100 may transmit a write request including a write command WT, an address ADD and write data DATA to the storage apparatus 200 to record the data. The storage apparatus 200 may operate to program the storage medium 260 with the write data based on the write command WT, the address ADD and the write data DATA.

The external device 100 may transmit a read request including a read command RD and an address ADD to the storage apparatus 200 to read the data. The storage apparatus 200 may read the data from the storage medium 260 and transmit the data to the external device 100.

In addition to read and write requests from external device 100, the storage apparatus 200 itself may generate a read request and a write request to read and write data from/to storage medium 260 to perform internal management operations and to manage the storage medium 260. The internal management operations may include house-keeping operations performed in response to the requests from the external device 100 to efficiently use storage space on the storage medium 260, such as a garbage collection operation, a wear-leveling operation, and a read reclaim operation, or an operation to guarantee the reliability of data stored on the storage medium 260.

The storage medium 260 may be coupled to the memory controller 210 via channels CH1 to CHn. The storage medium 260 may include non-volatile memory devices NVM1, NVM2, . . . , NVMn. In example embodiments, the non-volatile memory device NVM1, NVM2, . . . , NVMn may include at least one of various types of non-volatile memory devices such as a NAND flash memory device, a NOR flash memory device, a ferroelectric RAM (FeRAM), a magnetic RAM (MRAM) using a tunneling magneto-resistive (TMR) layer, a phase change memory device (PCRAM) using chalcogenide alloys, resistive memory device (ReRAM) using transition metal oxide, and the like.

Each of the non-volatile memory devices (NVM1, NVM2, . . . , NVMn) includes a plurality of memory cells. Each of the memory cells may operate as a single level cell (SLC) capable of storing one bit of data, or as a multi-level cell (MLC) capable of storing two or more bits of data.

Each of the nonvolatile memory devices NVM1, NVM2, . . . , NVMn may be configured to operate as a single-level cell (SLC) memory device, or may be configured to operate as a multi-level cell (MLC) memory device. In other cases, some of the non-volatile memory devices (NVM1, NVM2, . . . , NVMn) may be configured to operate as single-level cell (SLC) memory devices and some of them may be configured to operate as multi-level cell (MLC) memory devices.

In write and read operations, the buffer memory device 220 may temporarily store map data or the data that is transmitted or received between the external device 100 and the storage apparatus 200. Map data may be information mapping addresses of physical storage spaces including the storage medium 260 (physical addresses) and logical addresses assigned to the storage medium 260 by the external device.

The map data may be stored on the storage medium 260. At least one of the map data required for operation of the storage apparatus 200 may be loaded in the buffer memory device 220, and the memory controller 220 may use the loaded map data.

Figure 2:
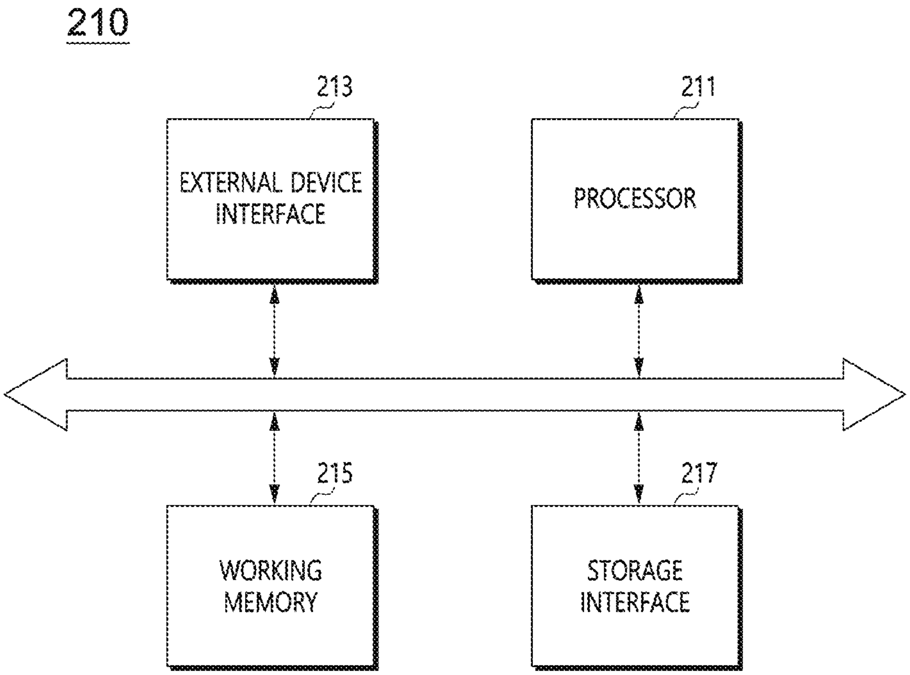
FIG. 2 is a block diagram of a memory controller according to embodiments of the disclosure.

FIG. 2 is a block diagram of a memory controller according to embodiments of the disclosure.

Referring to FIG. 2, a memory controller 210 of example embodiments may include a processor 211, an external device interface 213, a working memory 215 and a storage interface 217.

The processor 211 may be configured to operate by executing firmware or software provided on the hardware for various operations of the memory controller 210. The processor 211 may include at least one of a hardware, a firmware operated on the hardware and a combination of the hardware, the firmware and a software. In an embodiment, the processor 211 may perform functions of a flash translation layer (FTL) for managing a storage apparatus 200, such as address mapping, block management, garbage collection, wear-leveling, and the like.

The external device interface 213 may provide a communication channel for receiving commands and clock signals from an external device 100 and controlling the input and output of data under the control of the processor 211. In particular, the external device interface 213 may provide a physical connection between the external device 100 and the storage apparatus 200.

In example embodiments, the external device interface 213 may comply with a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA (SATA) protocol, a parallel-ATA (PATA) protocol, a small computer small interface (SCSI) protocol, ESDI (enhanced small disk interface) protocol, IDE (Integrated Drive Electronics) protocol, private protocol, SMBus (System Management Bus) protocol, I2C (Inter-Integrated Circuit) protocol, I3C (Improved Inter-Integrated Circuit) protocol, and the like, and may communicate with the external device 100 based on an interface using at least one of the various interface protocols.

The external device interface 213 may store write data provided from the external device 100 in a buffer memory device 220 under control of the processor 211. Read data stored in the buffer memory device 220 may be provided to the external device 100.

The working memory 215 may be configured as a random access memory device, such as dynamic random access memory (DRAM) or static random access memory (SRAM). The working memory 215 may store firmware that is executed by the processor 211. In addition, the working memory 215 may store data necessary to drive the firmware, such as metadata. The metadata may include system information or attributes corresponding to the memory block. The metadata may be stored in a specific page of the memory block, and the processor 211 may load the metadata into the working memory 215 and use it as needed for operations of the storage apparatus 200.

In addition, the working memory 215 may operate as the buffer memory for storing write data provided by the external device 100, read data read from a storage medium 260, or map data.

The storage interface 217 may provide a communication channel for transmitting and receiving signals between the memory controller 210 and the storage medium 260. The storage interface 217 may write data temporarily stored in the buffer memory device 220 to the storage medium 260 under a control of the processor 211. The storage interface 217 may, under the control of the processor 211, transmit the read data from the storage medium 260 to the buffer memory device 220, and the delivered read data may be temporarily stored in the buffer memory device 220.

Figure 3:
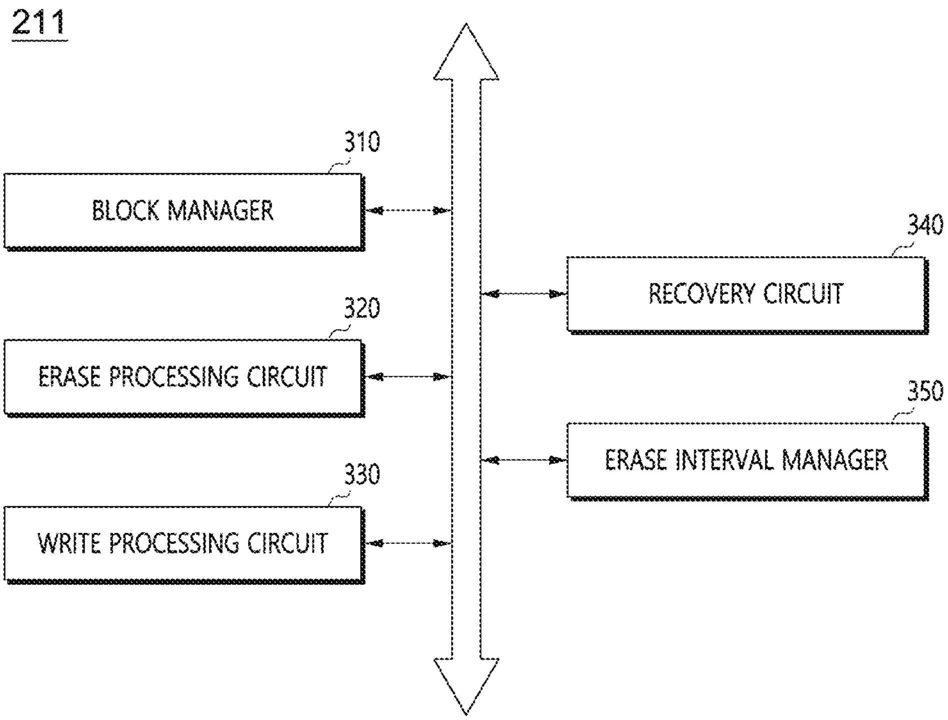
FIG. 3 is a block diagram of a processor according to embodiments of the disclosure.

FIG. 3 is a block diagram of a processor according to embodiments of the disclosure.

Referring to FIG. 3, a processor 211 may include a block manager 310, an erase processing circuit 320, a write processing circuit 330, a recovery circuit 340 and an erase interval manager 350.

The block manager 310 may allocate and release at least one memory block for processing external or internal requests. The block manager 310 may manage states of the memory block. The block manager 310 may include a pool of memory blocks organized according to the states of the memory blocks.

For example, a memory block may include at least one open memory block, at least one closed memory block and at least one free memory block. The open memory block may be a block that is allocated to write data according to a data storage state. The closed memory block may be a block whose data are programmed into all pages of the memory block. The free memory block may be a block in a state in which valid data may not be stored within the memory block. The free memory block may be converted to an open memory block. The memory blocks may include a normal block without bad data and a bad block that has bad data, and accordingly health states of the memory blocks may be determined.

Each memory block may include a plurality of pages. The block manager 310 may store meta-information for a specific page of a memory block. In example embodiments, the meta-information may include an erase indicator.

The erase processing circuit 320 may control a storage medium 260 to write data in a selected memory block. If the data is already stored in the selected memory block, then the previously stored data is erased by the erase processing circuit 320.

The write processing circuit 330 may control the storage medium 260 to program (write) data in the open memory block in units of a page. If the data is programmed in all pages of the selected memory block, then the selected memory block may be converted to the closed memory block. The write data may be provided by an external device 100 with a write request from the external device 100, or may be data related to the internal management and operation of a storage apparatus 200.

The write processing circuit 330 may write dummy data to the remaining storage space of an open memory block in order to convert the open memory block into a closed memory block. However, the write processing circuit 330 may include other functions in addition to the above functions.

In embodiments, the open memory block may be closed when a write cost of the open memory block exceeds a limited cost, or when a new memory block needs be opened because the data is stored in all pages of the open memory block. The open memory block may also be closed when the memory block has been used for more than a set time. The conditions that trigger the closing of an open memory block, however, are not limited to the above conditions.

The recovery circuit 340 may perform recovery operations to securely preserve user data and metadata in the event of a sudden power off (SPO) and when power is restored after the SPO.

When recovering a memory block that is in an open state at the time of an SPO, the recovery circuit 340 may write dummy data to an empty storage space that is not storing data for use in recovering the memory block, but operations of the recovery circuit 340 are not limited to the above.

The erase interval manager 350 may manage the timing of an erase operation on the memory block using an erase identifier. For example, the erase interval manager 350 may generate an erase indicator that is generated in a "round-robin" method, that is, incrementally within a set range and at the end of the set range, repeating the incremental sequence from the beginning. When trying to close a memory block, the erase interval manager 350 may provide the erase indicator as metadata to the block manager 310 to indicate when the memory block should be erased.

An erase interval manager 350 may generate an erase indicator and the dummy data that each of the write processing circuit 330 and the recovery circuit 340 writes may have a pattern corresponding to the erase indicator. In embodiments, the empty storage space of a closed memory block may be closed after a pattern corresponding to the erase indicator is fully written to the dummy data in the empty storage space. The metadata may include the same erase indicator as the pattern in the dummy data.

In embodiments, when the storage apparatus 200 begins to be used, the erase interval manager 350 may be configured to generate and update the erase indicator.

In embodiments, the erase interval manager 350 may enable an erase interval management mode based on the number of available memory blocks of the storage medium 260. This mode can be activated when the number of free memory blocks falls below a threshold TH, among other conditions.

The erase interval manager 350 may determine timing of an erase operation on the selected memory block by the block manager 320 in connection with processing write requests.

In embodiments, the erase interval manager 350 may obtain the erase indicator of a selected memory block from metadata of the selected memory block. The erase interval manager 350 may compare a current erase indicator with the erase indicator obtained from the metadata. The erase interval manager 350 may control the block manager 310 to select a different memory block for processing a write request when a difference between the current erase indicator and the obtained erase indicator from the metadata is below a reference value.

To perform a write request on the selected memory block when data is stored in all pages of the block, the data already stored in the selected memory block may be erased. Thus, the selected memory block, which was a closed memory block, is converted to an open memory block and data may be written in the open memory block. When the selected memory block for the write request is an invalidated memory block or a free memory block, data in the invalidated memory block or the free memory block needs to be erased to a degree that prevents degradation of data retention characteristics of the selected memory block.

The storage apparatus 200 may manage the erase dwell time to reduce the probability that the same memory block is repeatedly erased within a short time interval.

When most of the storage space on the storage medium 260 is programmed with valid data or unchanging cold data, the number of available memory blocks, e.g., invalid memory blocks or free memory blocks, is limited.

When internal management operations such as the wear-leveling, the garbage collection and the read reclaims are repeated across the limited number of available memory blocks, it may be difficult to ensure that memory blocks have enough erase dwell time to prevent degradation in performance.

In embodiments, when a memory block is determined to be a closed memory block, the processor 211 may record an erase indicator to metadata of the closed memory block. While the erase indicator is assigned and recorded in the metadata of the closed memory block, an update may occur in which the processor 211 generates and updates a new erase indicator (hereinafter, an updated erase indicator). The processor 211 may compare the assigned erase indicator in the metadata of the closed memory block with the updated erase indicator. For example, the assigned erase indicator and the updated erase indicator may be a digital code corresponding to a natural number (e.g., a natural number greater than or equal to 1 and less than or equal to 10) that is incrementally generated within a set range and repeated at the end of the set range from the beginning, and may be updated when the memory block is closed.

Therefore, when an erase interval between the assigned erase indicator and the updated erase indicator is less than or equal to a set threshold, it may be determined that the memory block was recently erased. The determination can be used to avoid selecting a recently erased memory block as a write target memory block, and as a result a recently erased memory block may be prevented from being erased repeatedly for a short period of time.

Although not shown in FIG. 3, the processor 211 may further include configuration circuits necessary for processing requests from the external devices or for the internal management operations of the storage apparatus 200, such as read processing circuits, map management circuits, internal operation processing circuits, and the like.

FIGS. 4 to 11 are configuration diagrams that illustrate erase interval management concepts in accordance with embodiments of the disclosure.

A memory block pool 400 may include memory blocks BLK1, BLK2, BLK3, BLK4, BLK5 and BLK6, an in-use (i.e., open) memory block BLK7 and a free (i.e., empty) memory block BLK8.

An erase interval manager 350 may enable an erase interval management mode when a storage apparatus 200 is initiated for use, or when the number of available memory blocks is determined to be below a threshold value, or when other set conditions are met. When the erase interval management mode is enabled, the erase interval manager 350 may generate erase indicators EI corresponding to a certain range of numbers (e.g., natural numbers greater than or equal to 1 and less than or equal to 10). The erase indicators EI may be assigned to the memory blocks to be closed.

At the beginning of the erase interval management mode, generated erase indicators EI may be generated with an initial value of 1.

Figure 4:
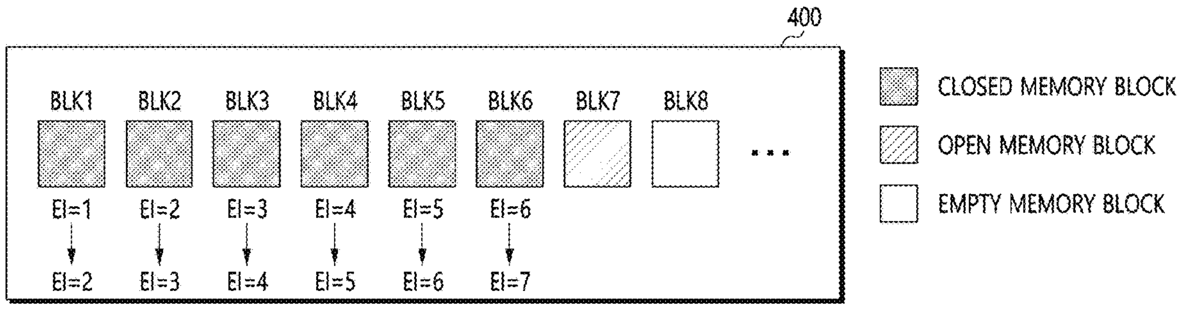
FIGS. 4 to 11 are configuration diagrams that illustrate erase interval management concepts in accordance with embodiments of the disclosure.

For example, the first memory block BLK1 of the memory pool 400 is selected for closure, and the erase indicator EI having a value1 may be generated. Referring to FIG. 4, the erase interval manager 350 may control a block manager 310 to be included the erase indicator (EI=1) in the metadata of the first memory block BLK1, and an erase indicator EI is updated and generated with a value of EI=2.

When the second memory block BLK2 is to be closed and the erase indicator EI is generated with a value EI=2. The erase interval manager 350 may control the block manager 310 to include the erase indicator (EI=2) in the metadata of the second memory block BLK2. The erase indicator with a value of EI=is updated and changed to an erase indicator with a value of EI=3.

When the third memory block BLK3 is selected for closure and is the erase indicator EI is generated with a value of EI=3. The erase interval manager 350 may control the block manager 310 to include the erase indicator (EI=3) in the metadata of the third memory block BLK3. The erase indicator EI=3 is updated and changed to an erase indicator with a value of EI=44.

When the fourth memory block BLK4 is closed and the erase indicator EI is generated with a value EI=4. The erase interval manager 350 may control the block manager 310 to include the erase indicator (EI=4) in the metadata of the fourth memory block BLK4. The erase indicator EI=4 is updated and changed to an erase indicator with a value of EI=5.

When the fifth memory block BLK5 is closed and the erase indicator EI is generated with a value EI=5. The erase interval manager 350 may control the block manager 310 to include the erase indicator EI=5 in the metadata of the fifth memory block BLK5. The erase indicator EI=5 of the closed block is updated and changed to a value of EI=6.

When the sixth memory block BLK6 is closed and the erase indicator EI is generated with a value EI=6. The erase interval manager 350 may control the block manager 310 to include the erase indicator EI=6 in the metadata of the sixth memory block BLK6. The erase indicator EI=6 is updated and changed to a value of EI=7.

When the memory blocks BLK1, BLK2, BLK3, BLK4, BLK5 and BLK6, which are to be closed, include empty storage spaces in which no data is stored, dummy patterns corresponding to the assigned erase indicators EI may be written to the empty storage spaces of the memory blocks BLK1, BLK2, BLK3, BLK4, BLK5 and BLK6, respectively, before closing the blocks.

Figure 5:
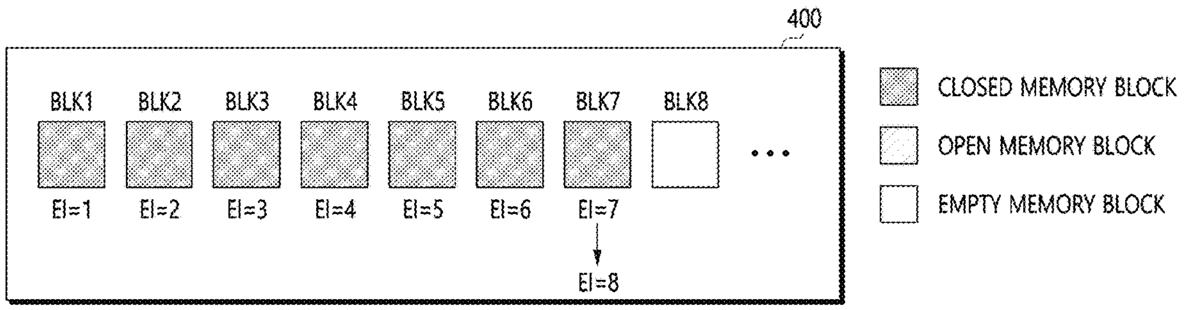

Referring to FIG. 5, the seventh memory block BLK7, which was illustrated as an open memory block in FIG. 4, is selected for closure, and the erase indicator is generated with a value EI=7. When the seventh memory block BLK7 is to be closed, the erase interval manager 350 may control the block manager 310 to include the erase indicator EI=7 in the metadata of the seventh memory block BLK7. The erase indicator EI=7 is updated and changed to a current updated erase indicator value of EI=8.

Figure 6:
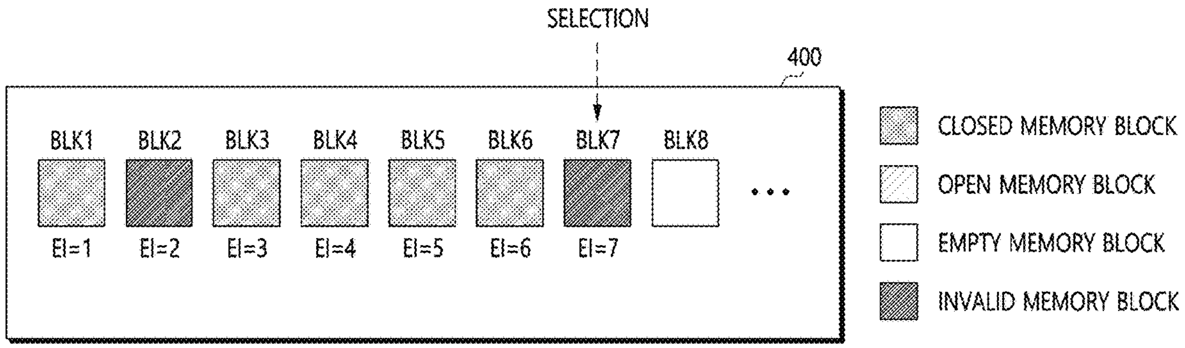

Alternatively, referring to FIG. 6, a memory block pool 400 may include closed memory blocks BLK1, BLK3, BLK4, BLK5 and BLK6, invalid memory blocks BLK2 and BLK7, and a free memory block BLK8. Memory blocks BLK1, BLK2, BLK3, BLK4, BLK5, BLK6 and BLK7 have previously assigned erase indicators EI=1 through EI=7. In this example, when the second memory block BLK2 and the seventh memory block BLK7 are invalid memory blocks, the memory block pool 400 may receive a write request.

To process the write request, the block manager 310 may select the seventh memory block BLK7, from among the available memory blocks, which include the invalid memory blocks BLK2 and BLK7 and the free memory block BLK8.

The erase interval manager 350 may obtain the assigned erase indicator (EI=7) of the seventh memory block BLK7 from the metadata of the seventh memory block BLK7. The erase interval manager 350 may determine an interval between the assigned erase indicator (EI=7) of the seventh memory block BLK7 and the current generated erase indicator (EI=8).

Since the interval between the assigned erase indicator of the seventh memory block BLK7 and the generated erase indicator is 1, which is below a threshold value (e.g., 2), the erase interval manager 350 may determine that the seventh memory block BLK7 was recently erased. Accordingly, the block manager 310 may reselect a memory block for processing the write request to extend the erase dwell time by avoiding reselection of the seventh memory block BLK7.

Figure 7:
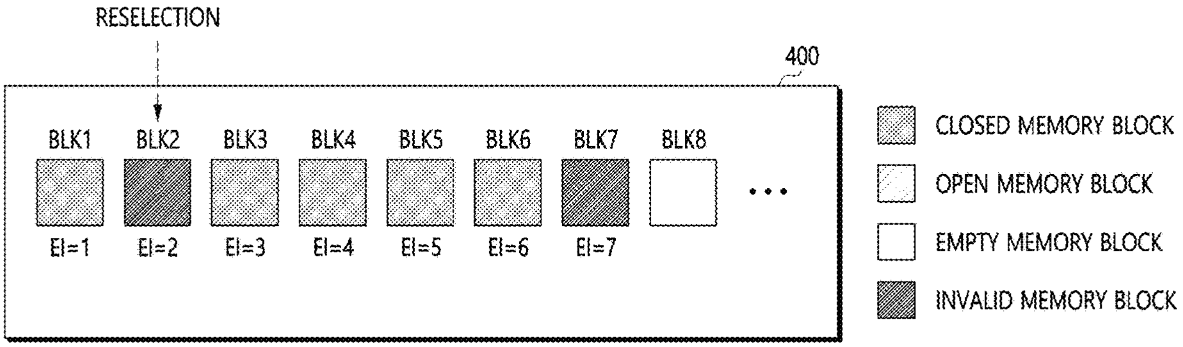

As a result, referring to FIG. 7, the block manager 310 may reselect the second memory block BLK2 as a memory block for processing the write request, instead of the seventh memory block BLK7. The request to reselect may be generated based on the interval between the assigned erase indicator of the seventh memory block BLK7 and the current generated erase indicators (e.g., EI=8) by the erase interval manager 350.

The erase interval manager 350 may determine an interval between the assigned erase indicator EI=2 obtained from the metadata of the second memory block BLK2 and the generated erase indicator EI=8.

Figure 8:
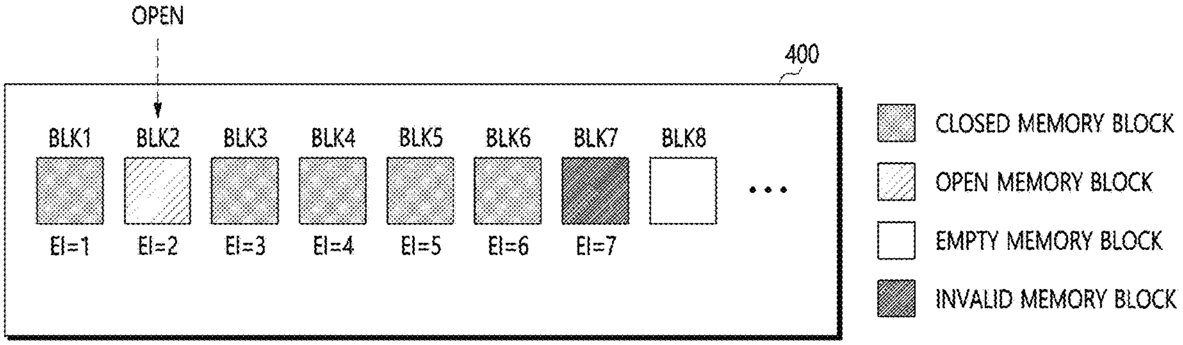
Figure 9:
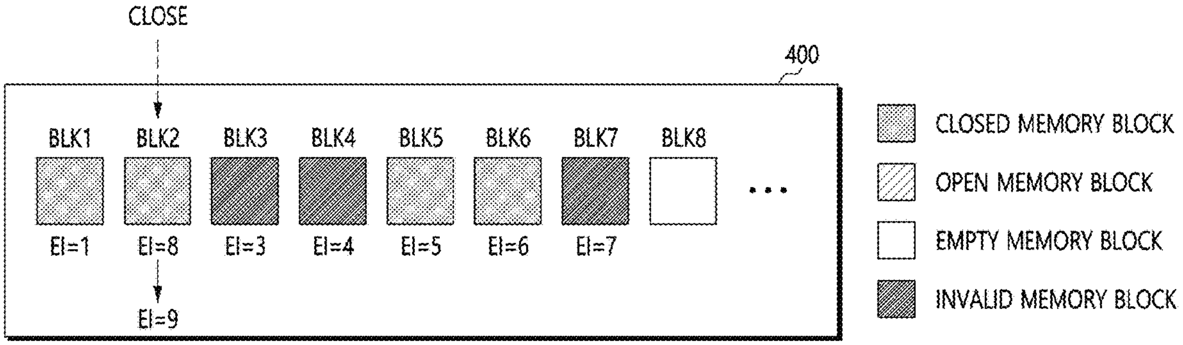

Referring to FIG. 8, since the interval is 6, which is above an example threshold value of 2, the erase interval manager 350 may control an erase processing circuit 320 to erase data of the second memory block BLK2. Thus, the second memory block BLK2, as the next memory block to be processed, is assigned the current erase indicator EI=8, and the second memory block BLK2 is converted from an invalid memory block to an open memory block. When the second memory block BLK2 is subsequently closed, the block manager 310 updates the erase indicator EI=8 of the closed block to a value of EI=9.

A memory block pool 400 may include closed memory blocks BLK1, BLK5 and BLK6, an open memory block BLK2, invalid memory blocks BLK3, BLK4 and BLK7, and a free memory block BLK8. Memory blocks BLK1, BLK2, BLK3, BLK4, BLK5, BLK6 and BLK7 have assigned erase indicators EI=1 through EI=7, respectively. The open second memory block BLK2 may be detected as the next memory block to be closed and assigned the current generated erase indicator, which is EI=8. While the second memory block BLK2 is still open, the memory block pool 400 may receive a write request.

The erase interval manager 350 may control the block manager 310 to close the second memory block BLK2. At this time, if an empty storage space exists in the second memory block BLK2, then the empty storage space may be written with dummy data corresponding to the erase indicator (EI=8), which is in the metadata of second memory block BLK2. The block manager 310 may update the erase indicator (EI=8) to with a value EI=9.

Figure 10:
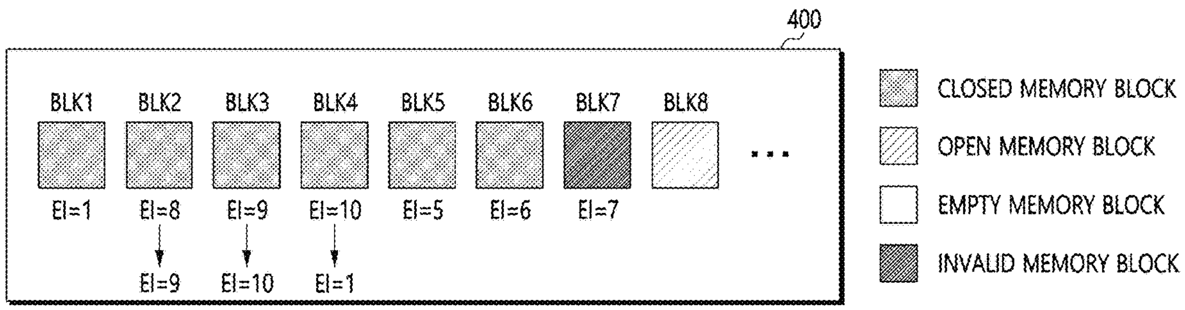
Figure 11:
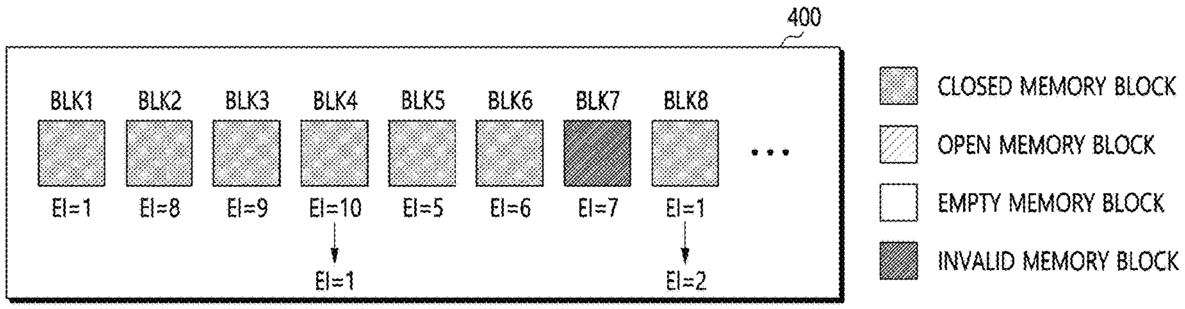

The invalid third memory block BLK3 may be selected to process the write request and be assigned, as the next memory block to be closed, the erase indicator EI=9. Referring to FIG. 10, data may be written to the third memory block BLK3 and when the third memory block BLK3 is closed, the erase interval manager 350 may control the block manager 310 such that the erase indicator (EI=9) of the third memory block BLK3, which is included in the metadata of the third memory block BLK3, is updated to erase indicator EI=10.

The invalid fourth memory block BLK4 may be selected next to process the write request and be assigned, as the next memory block to be closed after the third memory block BLK3, the erase indicator EI=10, and data may be written to the fourth memory block BLK4. Referring to FIG. 10, when the fourth memory block BLK4 is closed, the erase interval manager 350 may control the block manager 310 so that the erase indicator (EI=10) is updated. Thus, the erase indicator EI rom EI-10 to EI=1, when the erase interval manager 350 generates erase indicators EI corresponding to a range of natural numbers greater than or equal to 1 and less than or equal to 10, for example.

The eighth memory block BLK8 may be an empty memory block that is subsequently selected to process the write request. Since an erase indicator EI of the eighth memory block BLK8 was not assigned, the metadata of the eighth memory block BLK8 might not include any erase indicator EI. Because the erase interval manager 350 does not obtain an assigned erase indicator EI from the metadata of this target block, the eighth memory block BLK8 may perform the write request without any comparison operation between an assigned erase indicator and an updated erase indicator. By selecting the eighth memory block BLK8 as the next memory block to perform the write request, the eighth memory block BLK8 may be assigned the current generated erase indicator EI=1.

Thereafter, the erase interval manager 350 may control the block manager 310 such that when the eighth memory block BLK8 is closed, the erase indicator (EI=1) is updated to from EI=1 to EI=2.

As such, the erase interval manager 350 may prevent a memory block from being erased repeatedly based on the interval between the previously assigned erase indicator included in the metadata of the memory block and the updated erase indicator.

Figure 12:
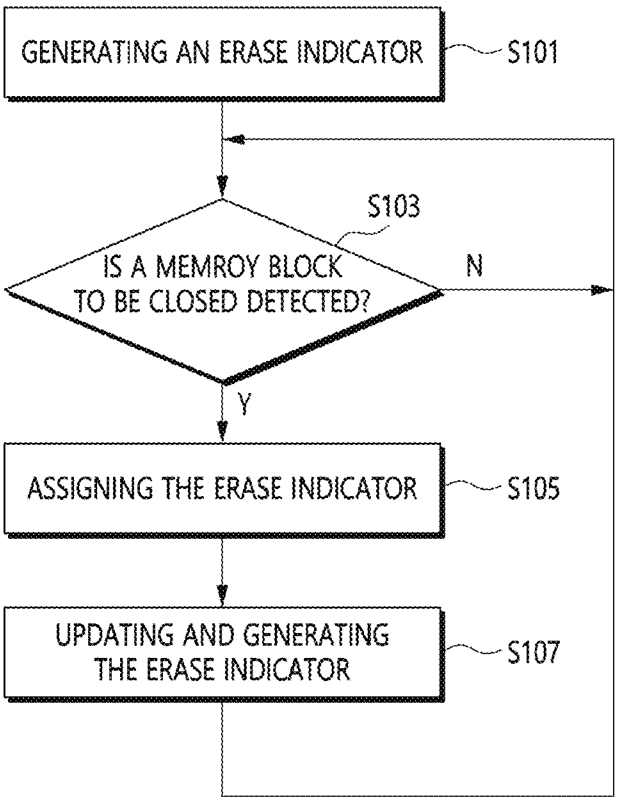
FIG. 12 is a flow chart illustrating an operation of a memory controller in accordance with embodiments of the disclosure.

FIG. 12 is a flow chart illustrating an operation of a memory controller in accordance with embodiments of the disclosure.

FIG. 12 illustrates a process in which a memory controller 210, including a processor 211, generates and assigns erase indicators to memory blocks when an operation of a storage apparatus 200 begins.

Referring to FIG. 12, when the operation of the storage apparatus 200 including a plurality of memory blocks begins, the memory controller 210 may generate erase indicators (S101) and assign the erase indicators to the memory blocks. In an example, the erase indicator may be a digital code corresponding to a number (e.g., a natural number greater than or equal to 1 and less than or equal to 10) that is generated and assigned in the round-robin way within a set range, meaning that the erase indicators are incrementally increased within the set range and the process repeated from the beginning at the end of the set range.

The memory controller 210 may detect at least one memory block to be closed among the plurality of memory blocks (S103). When the memory block to be closed is not detected (S103:N), the memory controller 210 may continue to monitor whether a memory block to be closed is detected (S103).

When the memory block to be closed is detected (S103: Y), the memory controller 210 may assign a generated erase indicator for the memory block to be closed (S105), which can be stored in the metadata of the memory block to be closed. The erase indicator is subsequently updated (S107) by the memory controller 210. The memory controller 210 may then continue to monitor a memory block to be closed among the memory blocks in operation, for example, the available memory blocks (S103).

Figure 13:
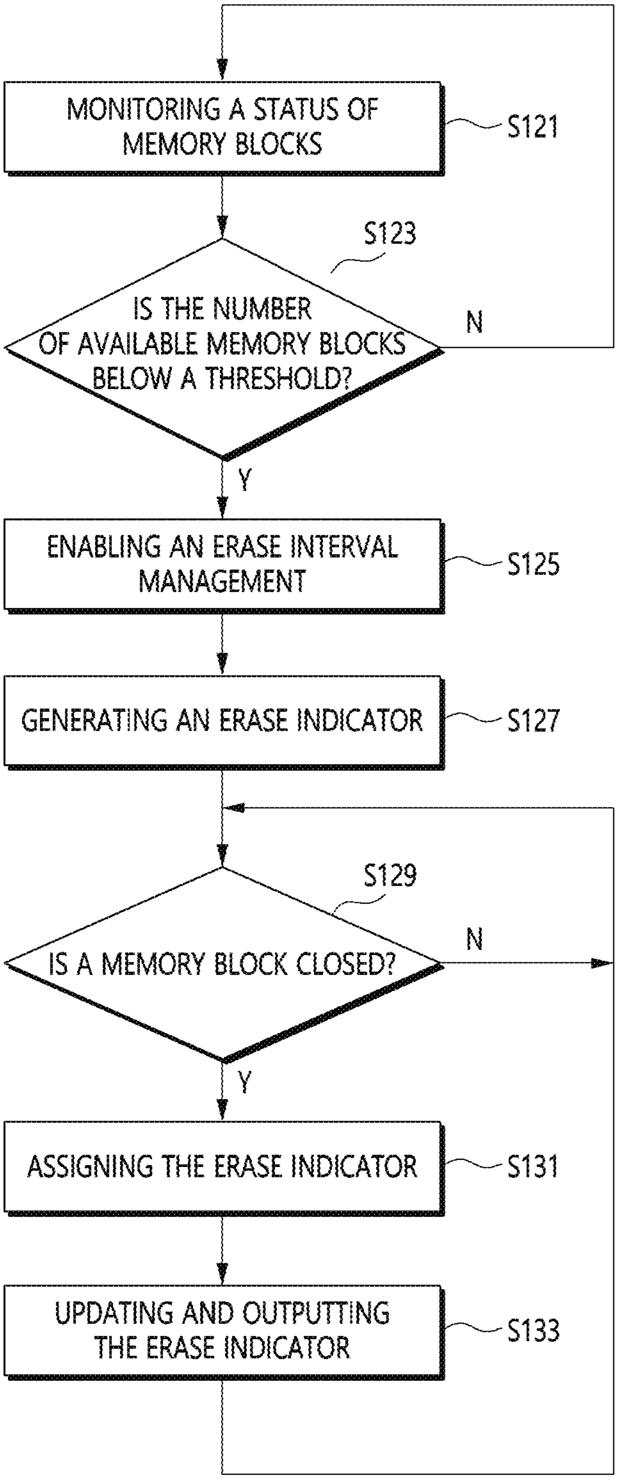
FIG. 13 is a flow chart illustrating an operation of a memory controller in accordance with embodiments of the disclosure.

FIG. 13 is a flow chart illustrating an operation of a memory controller in accordance with embodiments of the disclosure.

FIG. 13 illustrates a process in which a memory controller 210, including a processor 211, enables an erase interval management mode to generate and update an erase indicator.

Referring to FIG. 13, the memory controller 210 may monitor a condition of memory blocks included in a storage medium 260, such as the number of available memory blocks (S121). In embodiments, the available memory blocks may include invalid memory blocks and free memory blocks.

The memory controller 210 may determine (S123) that the number of available memory blocks is below a set threshold.

When the number of available memory blocks exceeds the set threshold (S123:N), the memory controller 210 may continue to monitor the status of the memory blocks (S121).

When the number of available memory blocks is below the set threshold (S123:Y), the memory controller 210 may enable an erase interval management mode (S125).

As the erase interval management mode is enabled, the memory controller 210 may generate erase indicators (S127) and assign the erase indicators to the available memory blocks, respectively. In an embodiment, the erase indicator may be a digital code corresponding to a number (e.g., a natural number greater than or equal to 1 and less than or equal to 10) that is incrementally updated within a set range, with the process repeating from the beginning of the set range after reaching the end of the set range.

The memory controller 210 may determine whether a memory block to be closed is detected among the available memory blocks (S129). When any memory block which is to be closed is not detected (S129:N), the memory controller 210 may continue to monitor for memory blocks to be closed from among the memory blocks in operation, such as for example the available memory blocks (S129).

When a memory block to be closed is detected (S129:Y), the memory controller 210 may assign the generated erase indicator to that block and move the assigned generated erase indicator to the metadata of the memory block to be closed (S131). When the memory block to be closed has been closed, the erase indicator is updated and output (S133).

The memory controller 210 may continue to monitor a memory block to be closed among the memory blocks in operation, for example, the available memory blocks (S129).

Figure 14:
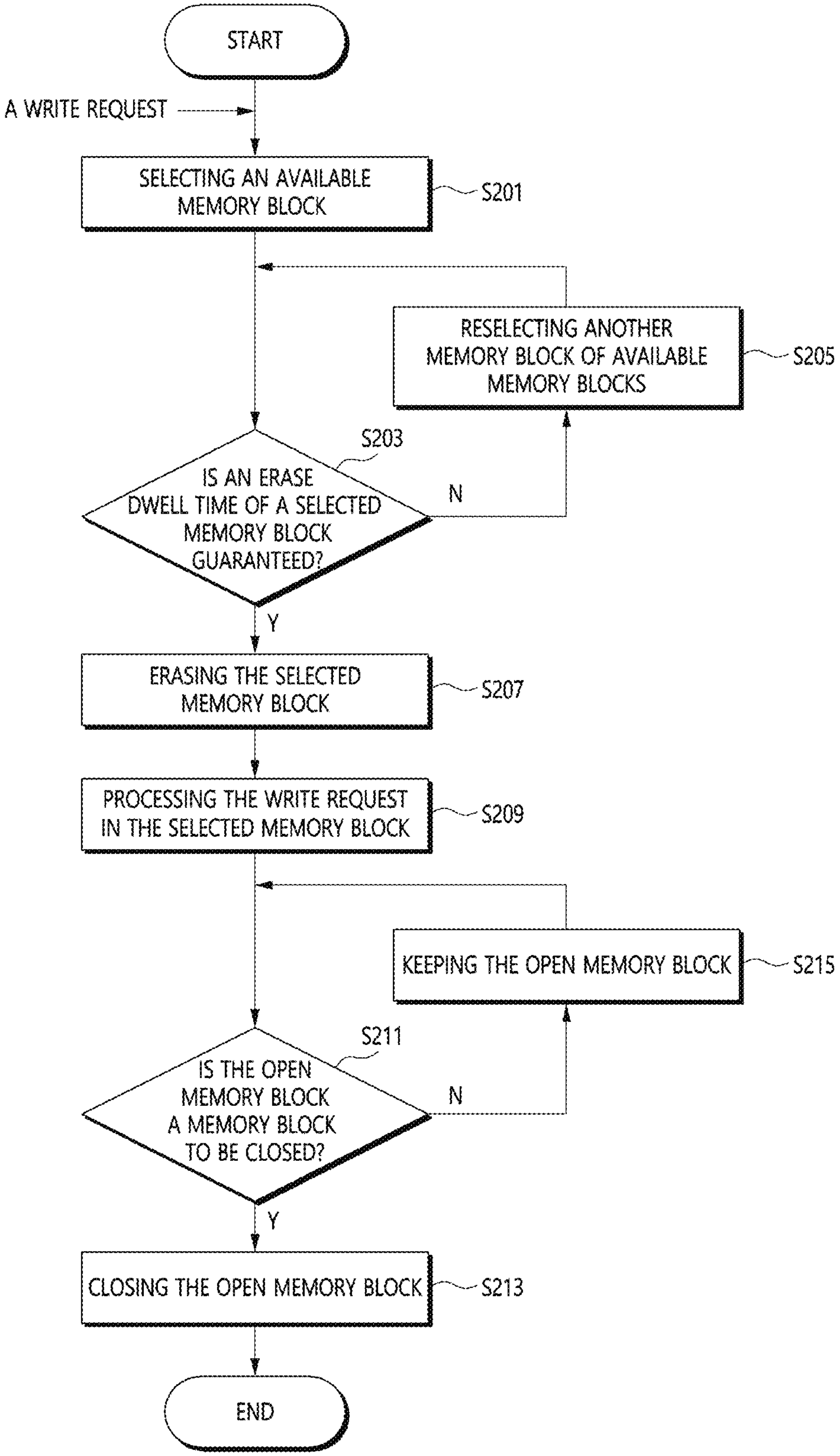
FIG. 14 is a flow chart illustrating an operation of a memory controller in accordance with embodiments of the disclosure.

FIG. 14 is a flow chart illustrating an operation of a memory controller in accordance with embodiments of the disclosure.

Referring to FIG. 14, when a write request is generated by an external device or by an internal management operation, a memory controller 210 may select at least one of available memory blocks (S201).

The memory controller 210 may determine whether an erase dwell time of the selected memory block is guaranteed (S203). In ab embodiment, the memory controller 210 may determine that the erase dwell time is guaranteed when an interval between an assigned erase indicator obtained from the metadata of the selected memory block and an updated erase indicator exceeds a threshold value.

When the erase dwell time of the selected memory block is not guaranteed (S203:N), the memory controller 210 may reselect one of the available memory blocks (S205). The memory controller 210 determines whether the erase dwell time of the reselected memory block is guaranteed (S203).

When the erase dwell time of the selected (or reselected) memory block is guaranteed (S203:Y), the memory controller 210 erases the selected memory block (S207) so that the selected memory block converts to an open memory block. A write request can be processed on the open memory block (S209).

Thereafter, the memory controller 210 may monitor whether any open memory blocks are to be closed (S211).

When at least one of the open memory blocks is a memory block to be closed (S211:Y), the memory controller 210 may close the open memory block, which converts to a closed memory block (S213). Thereafter, the assigned erase indicator of the closed memory block is moved to metadata of the closed memory block and an erase indicator is updated (S133), referring to FIG. 12.

For example, when a write cost of a selected memory block exceeds the limited cost, data already exists in a selected memory block, or a selected memory block is open for more than a set time, the selected memory block may become a closed memory block. However, conditions that trigger closure of a memory block are not limited to the above examples.

If the memory block to be closed includes an empty storage space, the memory controller 210 may write a dummy pattern corresponding to the erase indicator of the memory block to the empty storage space and then close the memory block.

When the memory block is closed, the memory controller 210 may generate an update to the erase indicator as described in FIG. 12 or FIG. 13.

When the open memory block is not a memory block to be closed (S211:N), the memory controller 210 may control the selected memory block to keep an open status (S215) and monitor the available memory blocks to determine whether at least one of the open memory blocks is the memory block to be closed (S211).

In this way, the erase dwell time may be obtained by determining when the memory block is erased based on the erase indicator that may be included in the metadata of the memory block to be opened.

Those skilled in the art to which the present invention belongs will understand that the invention may be practiced in other specific forms without altering its technical idea or essential features. It should therefore be understood that the embodiments described above are exemplary in all respects and are not intended to be limiting. The scope of the invention is indicated by the following patent claims rather than by the detailed description above, and all modifications or variations derived from the meaning and scope of the claims and their equivalents are to be construed as being within the scope of the invention.

What is claimed is:

1. A memory controller configured to control a storage medium including a plurality of memory blocks, comprising:

a processor configured to, in response to a determination that a number of available memory blocks is below a first threshold, enable an erase interval management mode in which the processor is further configured to generate a range of consecutive natural numbers in a cyclic order as a plurality of sequential erase indicators;

initialize a plurality of memory blocks selected to be closed from among the plurality of memory blocks by writing sequential erase indicators in the cyclic order into a metadata of each of the plurality of memory blocks selected to be closed, closing the plurality of memory blocks selected to be closed, and setting a current erase indicator to a next sequential erase indicator in the cyclic order;

receive a write request and in response:

select a target memory block from among the available memory blocks of the plurality of memory blocks to process the write request;

obtain the sequential erase indicator from the metadata of the target memory block and compare the obtained sequential erase indicator with the current erase indicator;

in response to a determination that a difference between the current erase indicator and the obtained sequential erase indicator exceeds a second threshold value, open the target memory block to process a write request, write a data to the target memory block, write the current erase indicator into the metadata of the target memory block, and increment the current erase indicator to the next sequential erase indicator in the cyclic order, wherein the available memory blocks are invalid memory blocks with stored invalid data and free memory blocks without stored valid data.

2. The memory controller of claim 1, wherein the processor generates a digital code corresponding to each of the sequential erase indicators in the cyclic order.

3. The memory controller of claim 2, wherein after the target memory block is opened to write the data, the processor erases the opened target memory block before writing the data.

4. The memory controller of claim 1, wherein the target memory block includes an empty storage space and after the target memory block is opened to write the data, the processor writes data with a pattern corresponding to the current erase indicator to the empty storage space.

5. The memory controller of claim 1, wherein the processor is further configured to determine that a first memory block from among the plurality of memory blocks is open at a time of a sudden power off, and recover the first memory block that is open at the time of the sudden power off, wherein the recovery of the first memory block includes writing a data in a pattern corresponding to the current erase indicator to a free storage space of the first memory block, writing the current erase indicator into a metadata of the first memory block and closing the first memory block, and incrementing the current erase indicator to the next sequential erase indicator in the cyclic order.

6. The memory controller of claim 1, wherein the processor is configured to select the target memory block by comparing the current erase indicator with the sequential erase indicators stored in the metadata of at least two closed memory blocks, in response to a determination that a difference between the current erase indicator and each of the obtained sequential erase indicators exceeds the second threshold, selecting the one of the at least two closed memory blocks with a larger difference as the target memory block.

7. The memory controller of claim 1, wherein the erase interval management mode is enabled in response to a determination that a number of invalid memory blocks is below the first threshold.

8. The memory controller of claim 1, wherein the erase interval management mode is enabled in response to a determination that a number of free blocks is below the first threshold.

9. A storage apparatus comprising:

a storage medium including a plurality of memory blocks; and a memory controller controlling the storage medium and including at least one processor, wherein the at least one processor is configured to:

in response to a determination that a number of available memory blocks is below a first threshold, enable an erase interval management mode in which the at least one processor is further configured to generate a range of consecutive natural numbers in a cyclic order as a plurality of sequential erase indicators;

initialize a plurality of memory blocks selected to be closed from among the plurality of memory blocks by writing sequential erase indicators in the cyclic order into a metadata of each of the plurality of memory blocks selected to be closed, closing the plurality of memory blocks selected to be closed, and setting a current erase indicator to a next sequential erase indicator in the cyclic order;

receive a write request and in response:

select a target memory block from among the available memory blocks of the plurality of memory blocks to process the write request;

obtain the sequential erase indicator from the metadata of the target memory block and compare the obtained sequential erase indicator with the current erase indicator;

in response to a determination that a difference between the current erase indicator and the obtained sequential erase indicator exceeds a second threshold value, open the target memory block to process a write request, write a data to the target memory block, write the current erase indicator into the metadata of the target memory block, and increment the current erase indicator to the next sequential erase indicator in the cyclic order, wherein the available memory blocks are invalid memory blocks with stored invalid data and free memory blocks without stored valid data.

10. The storage apparatus of claim 9, wherein the at least one processor is configured to generate a digital code corresponding to each of the sequential erase indicators in the cyclic order.

11. The storage apparatus of claim 10, wherein after the target memory block is opened to write the data, the at least one processor erases the opened target memory block before writing the data.

12. The storage apparatus of claim 9, wherein the target memory block includes an empty storage space and after the target memory block is opened to write the data, the at least one processor writes data with a pattern corresponding to the current erase indicator to the empty storage space.

13. The storage apparatus of claim 9, wherein the at least one processor is further configured to determine that a first memory block from among the plurality of memory blocks is open at a time of a sudden power off, and recover the first memory block that is open at the time of the sudden power off, wherein the recovery of the first memory block includes writing a data of a pattern corresponding to the current erase indicator to a free storage space of the first memory block, writing the current erase indicator into a metadata of the first memory block and closing the first memory block, and incrementing the current erase indicator to the next sequential erase indicator in the cyclic order.

14. The storage apparatus of claim 9, wherein the at least one processor is configured to select the target memory block by comparing the current erase indicator with the sequential erase indicators stored in the metadata of at least two closed memory blocks, in response to a determination that a difference between the current erase indicator and each of the obtained sequential erase indicators exceeds the second threshold, selecting the one of the at least two closed memory blocks with a larger difference as the target memory block.

15. The storage apparatus of claim 9, wherein the erase interval management mode is enabled in response to a determination that a number of invalid memory blocks is below the first threshold.

16. The storage apparatus of claim 9, wherein the erase interval management mode is enabled in response to a determination that a number of free blocks is below the first threshold.

17. A method of operating a memory controller, the memory controller including a processor that controls a storage medium including a plurality of memory blocks, the method comprising:

determining that a number of available memory blocks in the plurality of memory blocks is below a predetermined first threshold;

enabling an erase interval management mode in which the processor performs generating a range of consecutive natural numbers in a cyclic order as a plurality of sequential erase indicators;

initializing a plurality of memory blocks selected to be closed from among the plurality of memory blocks by writing sequential erase indicators in the cyclic order into a metadata of each of the plurality of memory blocks selected to be closed, closing the plurality of memory blocks selected to be closed, and setting a current erase indicator to a next sequential erase indicator in the cyclic order;

receiving a write request and in response:

selecting a target memory block from among the available memory blocks of the plurality of memory blocks to process the write request;

obtaining the sequential erase indicator from the metadata of the target memory block and comparing the obtained sequential erase indicator with the current erase indicator;

determining that a difference between the current erase indicator and the obtained sequential erase indicator exceeds a second threshold value, opening the target memory block to process a write request, writing a data to the target memory block, writing the current erase indicator into the metadata of the target memory block, and incrementing the current erase indicator to the next sequential erase indicator in the cyclic order, wherein the available memory blocks are invalid memory blocks with stored invalid data and free memory blocks without stored valid data.

18. The method of claim 17, the method further comprising:

erasing the opened target memory block before writing the data to the target memory block.

19. The method of claim 17, the method further comprising:

writing, by the processor, a data in a pattern corresponding to the current erase indicator to an empty storage space of the target memory block.

20. The method of claim 17, further comprising enabling the erase interval management mode after determining that a number of invalid memory blocks is below the predetermined first threshold.

* * * * *